(12) United States Patent
Wieder

(10) Patent No.: US 6,612,619 B2
(45) Date of Patent: Sep. 2, 2003

(54) QUICK COUPLER RETENTION CLIP AND METHOD

(76) Inventor: Martin H. Wieder, N8771 Hwy. X, Watertown, WI (US) 53094

( * ) Notice: Subject to any disclaimer, the term of this patent is extended or adjusted under 35 U.S.C. 154(b) by 183 days.

(21) Appl. No.: 09/225,788

(22) Filed: Jan. 5, 1999

(65) Prior Publication Data

US 2001/0045743 A1 Nov. 29, 2001

(51) Int. Cl.[7] .................................................. F16L 55/00
(52) U.S. Cl. ........................... 285/23; 285/45; 285/114; 285/117; 285/305
(58) Field of Search ................................. 285/114, 117, 285/305, 23, 45; 439/369, 371; 24/339, 336, 326

(56) References Cited

U.S. PATENT DOCUMENTS

| | | | | | |
|---|---|---|---|---|---|
| 721,577 | A | * | 2/1903 | Lindner | 285/114 |
| 770,982 | A | * | 9/1904 | Plassmann | 285/114 |
| 874,378 | A | * | 12/1907 | Allen | 285/114 |
| 883,220 | A | * | 3/1908 | Middlebrook | 285/114 |
| 1,072,896 | A | * | 9/1913 | Albee | 285/114 |
| 1,759,567 | A | * | 5/1930 | Dibner | 285/114 X |
| 1,989,823 | A | * | 2/1935 | Raabe | 439/369 X |
| 2,143,177 | A | * | 1/1939 | Whyte | 285/305 X |
| 2,455,760 | A | * | 12/1948 | Gustafson | 285/114 |
| 2,461,427 | A | * | 2/1949 | Kneebone | 285/114 X |
| 2,699,915 | A | * | 1/1955 | Goepfrich | 285/305 X |
| 2,753,536 | A | * | 7/1956 | Tjader | 439/369 |
| 2,774,049 | A | * | 12/1956 | Kibler et al. | 439/371 X |
| 3,272,536 | A | * | 9/1966 | Weinhold | 285/114 |
| 3,475,716 | A | * | 10/1969 | Laig | 439/369 |
| 3,881,753 | A | * | 5/1975 | Bochory | 285/114 X |
| 3,894,758 | A | * | 7/1975 | Smith | 285/305 |
| 4,183,603 | A | * | 1/1980 | Donarummo | 439/369 |
| 4,204,738 | A | * | 5/1980 | Tillotson | 439/369 |
| 4,230,109 | A | * | 10/1980 | Geiss | 285/114 X |
| 4,333,505 | A | * | 6/1982 | Jones et al. | 285/305 X |
| 4,340,244 | A | * | 7/1982 | Scott | 285/114 |
| 4,352,586 | A | * | 10/1982 | Hayden | 285/305 X |
| 4,664,463 | A | * | 5/1987 | Carmo | 439/369 |
| 4,741,590 | A | * | 5/1988 | Caron | 439/369 X |
| 4,826,486 | A | * | 5/1989 | Palsrok et al. | 285/114 X |
| 4,913,468 | A | * | 4/1990 | Rattmann | 285/114 X |
| 5,016,922 | A | | 5/1991 | Le Mer et al. | 285/81 |
| 5,060,689 | A | * | 10/1991 | Csaszar et al. | 285/93 X |
| 5,066,049 | A | | 11/1991 | Staples | 285/80 |
| 5,152,555 | A | | 10/1992 | Szabo | 285/93 |
| 5,248,306 | A | * | 9/1993 | Clark et al. | 285/114 X |

(List continued on next page.)

FOREIGN PATENT DOCUMENTS

| | | | | |
|---|---|---|---|---|
| DE | 2711360 | * | 9/1978 | 285/114 |
| FR | 1447347 | * | 6/1966 | 285/114 |
| GB | 432223 | * | 7/1935 | 285/114 |
| GB | 2205137 | * | 11/1988 | 285/114 |
| GB | 2253666 | * | 9/1992 | 285/114 |
| GB | 2274887 | * | 8/1994 | 285/114 |

Primary Examiner—Lloyd A. Gall
(74) Attorney, Agent, or Firm—Ziolkowski Patent Solutions Group, LLC

(57) ABSTRACT

A quick coupler retention clip is disclosed for preventing an inadvertent disconnection of a quick coupler. The clip device includes a unitary clip having a first and a second end. The first end of the clip is of annular configuration so that the body of the coupler extends through the annular first end for anchoring the first end of the clip relative to the body. The second end of the clip is a C-shaped configuration to removably engage a groove defined between a collar and the body of the coupler. A strap extends between the first and second ends of the clip for securing the first and second ends of the clip together. The disconnection of the body from the port of the quick coupler is permitted only when the C-shaped second end is removed from engagement with the groove so that inadvertent disconnection of the body from the port is prevented.

3 Claims, 2 Drawing Sheets

U.S. PATENT DOCUMENTS

| | | | |
|---|---|---|---|
| 5,284,369 A | | 2/1994 | Kitamura .................... 285/322 |
| 5,293,913 A | * | 3/1994 | Preszler .................... 285/93 X |
| 5,366,259 A | | 11/1994 | Hohmann et al. .......... 285/305 |
| 5,395,140 A | | 3/1995 | Wiethorn ..................... 285/93 |
| 5,401,063 A | | 3/1995 | Plosz .......................... 385/81 |
| 5,423,775 A | * | 6/1995 | Cannon ................. 285/305 X |
| 5,437,483 A | | 8/1995 | Umezawa ................... 285/308 |
| 5,695,223 A | | 12/1997 | Boticki ........................ 285/23 |
| 5,766,032 A | * | 6/1998 | LaPointe et al. ............ 439/371 |
| 5,803,509 A | * | 9/1998 | Adams ....................... 285/114 |
| 5,904,221 A | * | 5/1999 | Breitweg et al. ....... 285/305 X |

\* cited by examiner

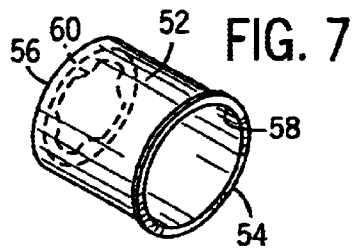
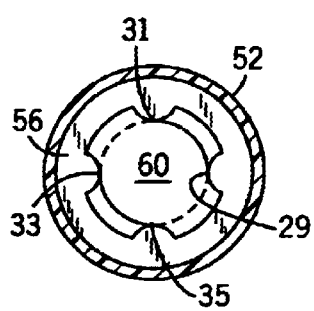
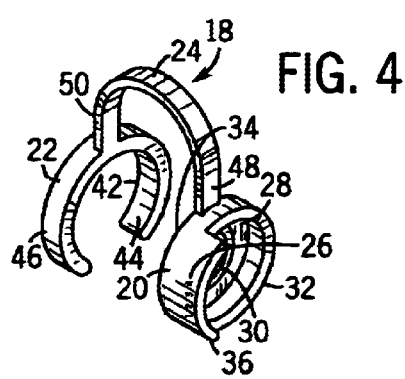
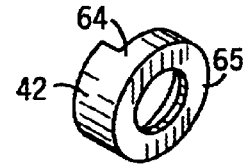
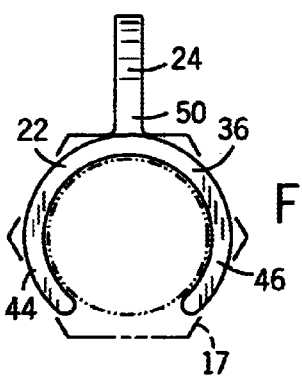
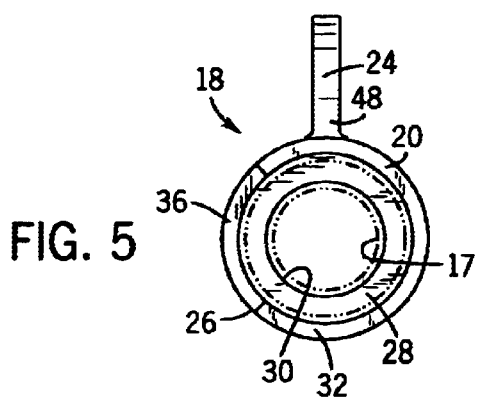
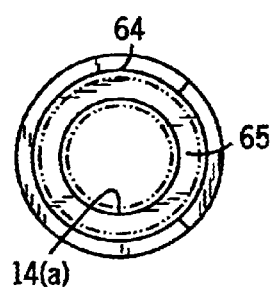

QUICK COUPLER RETENTION CLIP AND METHOD

BACKGROUND OF THE INVENTION

The present invention relates generally to a quick coupler retention clip, and more particularly to a quick coupler retention clip for preventing an inadvertent disconnection of a body from a port of a quick coupler.

In various industrial settings such as the automotive, appliance, housewares and electronics industries, many individual portions of products include parts that are formed from different plastic materials by such methods as injection molding, blow molding, thermo-forming, rotational molding or other molding methods. The plastic materials employed in these fabrication methods are usually heated and cooled by a pressurized liquid, such as water or other medium, and the liquid is generally supplied from a number of supply outlets.

In practice, several different types of liquid are connected to respective inlets and outlets. Flexible pipe couplings are connected to each of the respective inlets or outlets so that the particular liquid, for example heated water, may be supplied to and from application locations. However, it is essential that the correct flexible pipe or hose coupling be attached to the correct inlet or outlet port so that the right type of liquid medium is applied to the correct port.

Furthermore, it is very important that a quick coupler be disconnected only after the pressurized supply has been turned off, otherwise it is possible for the operator to disconnect the respective portions of the pipe coupler prematurely, thereby allowing the liquid medium to escape unrestricted.

Likewise, such couplers typically can accumulate dirt and debris on the inside thereof or become worn such that an operator may carelessly believe that the coupler is properly connected, when in fact, it is not. Under such conditions, once the line is pressurized, the coupler can disconnect, allowing the pressurized substance to escape freely.

Therefore, it would be desirable to have a quick coupler retention clip for use with a multiplicity of supply couplings which would prevent the inadvertent disconnection of respective portions of a quick coupler and would ensure the proper coupling of the couplers and provide a way to properly identify each coupler with its respective port.

SUMMARY OF THE INVENTION

The present invention provides a quick coupler retention clip that overcomes the aforementioned problems, and provides a cost effective way to ensure proper coupling of quick-connect couplers and a way to easily identify each hose to its respective location.

In accordance with one aspect of the invention a quick coupler retention clip device is provided for use on a quick connect coupler having a body, a collar and a port. The clip device includes a unitary clip having a first and a second end, the first end of the clip being of annular configuration such that the body of the coupler extends through the annular first end for anchoring the first end of the unitary clip relative to the body. The second end of the unitary clip has a C-shaped configuration to removably engage a groove disposed between the body and the collar of the coupler when the collar is in a locked disposition thereof. Additionally, a strap extends between the first and second ends of the clip for securing the first and second ends together. The arrangement is such that disconnection of the body and the port of the coupler is permitted only when the C-shaped second end is removed from engagement with the groove so that inadvertent disconnection of the body from the port is prevented.

In accordance with another aspect of the invention, the quick coupler retention clip device further includes a cap of generally cylindrical configuration, the cap having a first and a second side. The first side of the cap defines an orifice for the removable reception therein of the body of the coupler. The second side of the cap defines an opening which encircles the port of the coupler. The port releasably cooperates with the body so that in use of the device, the cap is secured to the port by engagement of the port within the opening. The orifice permits the removable connection of the body such that the body and port are coupled together. Additionally, the cap is color-coded with respect to the unitary clip so that correct coupling together of only the body and port is permitted.

In yet another aspect of the present invention, the quick coupler retention clip device further includes a ring-shaped portion which is secured to and extends around a connector of the coupler. The ring-shaped portion is disposed such that the annular first end of the clip is disposed between the ring-shaped portion and the C-shaped second end of the clip.

Additionally, the ring-shaped portion, the unitary clip and the cap are color-coded so that each portion of the coupler is readily identifiable so that inadvertent coupling together of an incorrect portion is inhibited and so that disconnection of the body from the port of the coupler is prevented until the C-shaped second end of the clip has been disengaged from the body of the coupler.

Also, the present invention includes a method for preventing an inadvertent disconnection of a body from a port of a quick coupler. The method includes the steps of: 1) anchoring a first end of a unitary clip relative to the body, the first end of the clip being of annular configuration such that the body of the coupler extends through the annular first end; 2) removably engaging the body of the coupler with a second end of the clip, the second end having a C-shaped configuration such that the C-shaped second end cooperates with the body of the coupler; and 3) permitting disconnection of the body from the port only when the C-shaped second end is removed from engagement with the body of the quick coupler so that inadvertent disconnection of the body from the port of the quick coupler is prevented.

Accordingly, one object of the present invention is to provide a quick coupler retention clip which prevents an inadvertent disconnection of a body from a port of a quick coupler.

Another object of the invention is to provide a cap which is color-coded with respect to a unitary clip so that correct coupling together of only a body and port of a coupler is permitted.

Another object of the invention is to provide a cap, a unitary clip and a ring-shaped portion that are color-coded and/or which include indicia to ensure the correct coupling together of the respective portions of the coupler.

Another object of the present invention is to provide a quick coupler retention clip device which permits insertion of a C-shaped end of a unitary clip into a groove of the body only when the body and port are correctly connected so that in the event of the coupler becoming worn or the accumulation of dirt and debris within the coupler, the body and port must be correctly seated and connected together before the C-shaped end can be inserted into the groove.

Various other features, objects and advantages of the present invention will be made apparent from the following detailed description and the drawings.

BRIEF DESCRIPTION OF THE DRAWINGS

The drawings illustrate the best mode presently contemplated for carrying out the invention.

In the drawings:

FIG. 4 is a perspective view of the unitary clip shown in FIG. 2.

FIG. 5 is a sectional view taken along line 5—5 of FIG. 1.

FIG. 6 is a sectional view taken along line 6—6 of FIG. 1

FIG. 7 is a perspective view of the cap shown in FIG. 3.

FIG. 8 is a sectional view taken along line 8—8 of FIG. 2.

FIG. 10 is a perspective view of the ring-shaped portion shown in FIG. 2.

FIG. 11 is a sectional view taken along line 11—11 of FIG. 1.

DETAILED DESCRIPTION OF THE PREFERRED EMBODIMENT

Figure 1:
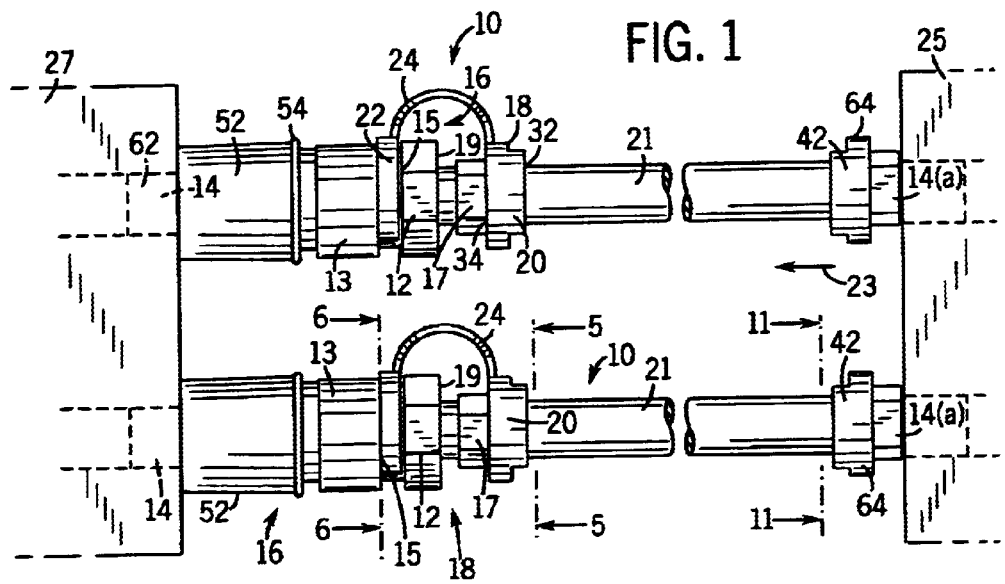
FIG. 1 is a side elevational view of two quick coupler retention clip devices fitted to respective quick couplers according to the present invention.

Referring to FIG. 1, a pair of quick coupler retention clip devices according to the present invention is shown, with each device being generally designated 10. The quick coupler retention clip device 10 prevents an inadvertent disconnection of a body 12 of a quick coupler generally designated 16 from a port 14. The body 12 is provided with a collar 13 which is slidable axially relative to the body so that the collar 13 and body 12 define therebetween an annular groove 15. The coupler 16 is threadedly attached to a male plug 17 which is threadedly engaged in the rear portion 19 of the body 12 of the coupler 16. The other end of the male plug 17 is engaged in a hose 21 for transferring a medium from a source housing 25 to an application zone 27.

The clip device 10 includes a unitary clip generally designated 18 having a first and a second end 20 and 22, respectively. FIG. 1 preferably shows a liquid medium flowing as indicated by arrow 23 from the source housing 25 to the application zone 27. Typically, the liquid medium is water or a water solution, and is preferably pressurized. The liquid medium may also comprise other solutions or even other media depending upon the requirements of the application. Moreover, because the applications may involve mold cooling or mold heating, the medium can be at a relatively cool or relatively hot temperature. The coupler devices 10 may be used for conveying many different types of materials. Therefore, it is essential that the correct portions of the complementary parts of the couplers be connected together and that the quick couplers be positively and completely connected together.

As shown in FIG. 1, the first end 20 of the clip 18 is of annular configuration such that the body 12 of the coupler 16 extends through the annular first end 20 for anchoring the first end 20 of the clip 18 relative to the body 12. Also, the second end 22 of the clip 18 is of C-shaped configuration such that the C-shaped second end 22 removably engages the body 12 of the coupler 16. The second end 22 is receivable into the annual groove 15 to lock the slidable collar 13 and prevent the inadvertent removal of the quick coupler 16 from the port 14.

Additionally, a strap 24 extends between the first and the second ends 20 and 22 of the clip 18 for securing the first and second ends 20 and 22 together. The arrangement is such that disconnection of the body 12 of the quick coupler 16 from the port 14 is permitted only when the C-shaped second end 22 is removed from engagement with the groove 15 of the body 12 of the coupler 16 so that inadvertent disconnection of the body 12 from the port 14 is prevented.

Although not shown, it will be appreciated that multiple quick coupler connections may be made, and such multiple connections may be divided into different application zones corresponding to a particularized function, i.e., heating or cooling. With multiple connections possible, it is essential that each male/female connection is properly made to ensure that each zone performs its application in an acceptable manner.

In a more specific embodiment of the present invention, the clip 18 is fabricated from a plastics material. More particularly, the clip 18 is fabricated from a resilient material which permits repeated engagement and disengagement of the C-shaped second end 22 of the clip 18 from the groove 15 of the body 12 of the coupler 16.

Figure 2:
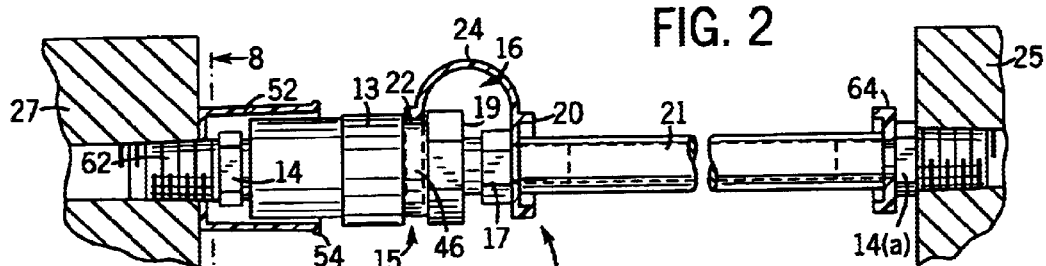
FIG. 2 is a side elevational view, partially in section of a quick coupler retention clip fitted to a quick coupler as shown in FIG. 1.

FIG. 2 is a view of one of the quick couplers 16 shown in FIG. 1 with the unitary clip 18 shown in section. As shown, the groove 15 is just slightly wider than the C-shaped second end 22 so that when engaged into groove 15, the slidable collar 13 cannot move rearward and disengage from the port 14. FIG. 2 also more clearly shows port 14 as a male connector threadedly engaged in the application zone 27 and connected into the quick coupler 16. The source housing 25 also has a port 14(a) threadedly engaged into the source housing 25.

Figure 3:
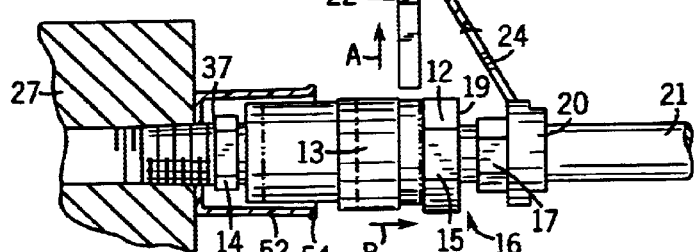
FIG. 3 shows a portion of the device of FIG. 2. with the unitary clip disengaged.
Figure 9:
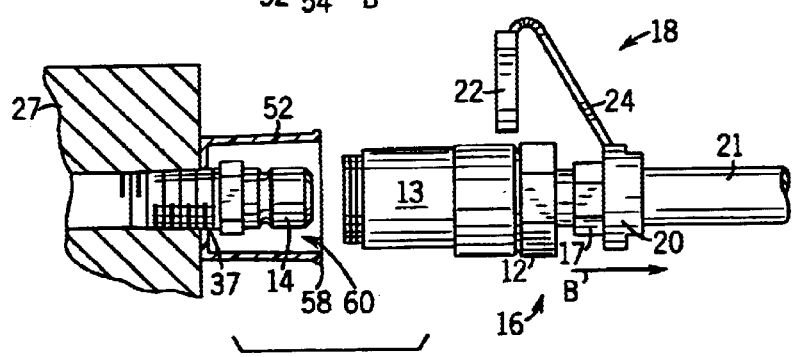
FIG. 9 is a side elevational view partially in section of a portion of FIG. 2 showing the body removed from the port of the coupler.

FIG. 3 shows the C-shaped second end 22 of the clip device 10 removed and out of engagement with the groove 15 of the coupler 16 as indicated by the arrow A. With the C-shaped second end 22 of the clip device 10 removed from engagement from groove 15, the collar 13 can be moved rearward as indicated by arrow B to disengage the coupler 16 from the port 14, as best shown in FIG. 9.

FIG. 4 is a perspective view of the unitary clip 18 shown in FIGS. 1–3. As shown in FIG. 4, the clip 18 includes indicia 26 thereon for identification. Such indicia 26 can be printed or embossed into the surface of the clip 18 to identify which port of the application zone 27 the respective coupler belongs to. Additionally or alternatively, the clip 18 can be color-coded for the same identification purpose. The first end 20 of the clip 18 includes an annulus 28 which defines a bore 30 for the reception therein of the male plug 17 of the coupler 16. The annulus 28 has a first and a second face 32 and 34 respectively such that when the male plug 17 is inserted through the annulus 28, the first and second faces 32 and 34 resiliently engage the male plug 17, and thus the coupler 16, to secure the clip 18 to the body 12.

FIG. 5 is a sectional view along line 5—5 of FIG. 1 and shows the first end 20 of the clip 18 as including a wall 36 which extends axially from one of the faces 32 and 34. The wall 36 extends around a portion of an outer circumference of the annulus 28. Furthermore, the wall 36 can include an indicia 26 for indicating which port 14 in the application zone 27 the respective coupler should be coupled to. For example, a reference can be printed, embossed, or adhered to the wall 36 for such identification. FIG. 5 also better shows annulus 28 defining inside bore 30 which retains the clip 18 between the male plug 17 and hose 21.

Referring to FIG. 6, the second end 22 of the clip 18 is shown with the male plug 17 in phantom. The second end 22 includes a first and a second arm 44 and 46 respectively which resiliently cooperate with the groove 15 of the body 12 of the coupler 16 so that engagement and removal of the second end 22 of the clip 18 from the body 12 of the coupler 16 is permitted. The first end 20 and the second end 22 of clip 18 are connected to strap 24. The strap 24 has a first and a second extremity 48 and 50 respectively. The first extremity 48 is secured to the first end 20 of the clip 18 while the second extremity 50 is secured to the second end 22 of the clip 18. Additionally, the strap 24 is fabricated from a resilient material and defines a substantially U-shaped configuration when the first and second ends 20 and 22 of the clip 18 are disposed in operable engagement with the body 12 of the coupler 16 and the hose 21.

Referring to FIG. 7, the device 10 further includes a cap 52 of generally cylindrical configuration. The cap 52 has a first and a second side 54 and 56 with the first side 54 of the cap 52 defining an orifice 58 for the removable reception therein of the coupler 16.

Referring to FIG. 8, a sectional view taken along line 8—8 of FIG. 2 shows the second side 56 of the cap 52 defining an opening 60. The second side 56 engages the port 14 of the coupler 16, as best shown in FIG. 3. The second side 56 has four extensions 29, 31, 33 and 35 to resiliently secure the cap 52 about the stem 37 of the port 14 as shown in FIG. 3.

Referring to FIG. 9, the port 14 releasably cooperates with the coupler 16 so that when collar 13 is slid rearward, the body 12 is disengaged from the port 14. The orifice 58 permits the removable insertion therein of the body 12 such that the body 12 and the port 14 can be coupled together. The cap 52 is color-coded with respect to the unitary clip 18 so that coupling of the correct body 12 to the correct port 14 is accomplished.

Referring now to FIG. 10, the device 10 further includes a ring-shaped portion 64 which is secured to and extends around a male plug 14(a) of the medium source 25, as shown in FIG. 2. FIG. 11 is a view of the ring shaped portion 64 and the male plug 14(a) taken along line 11—11 of the FIG. 1. The ring shaped portion 64 has a rear wall 65 for retention about the male plug 14(a). The ring shaped portion 64 has an outwardly extending tab 42, FIG. 10, which can be used for printing the same indicia as that printed on the similar shaped tab of the clip 18. Similarly, the ring-shaped portion 64 is color-coded the same as clip 18 and cap 52. The color-coding and/or the indicia printing allows for accurate matching of ports and connectors when any or all of the hoses 21 are replaced. The color-coding also allows each coupler 16 to be readily identifiable so that inadvertent coupling together of an incorrect portion is inhibited.

In operation, an inadvertent disconnection of the body from the port of a quick coupler is prevented by anchoring a first end of a unitary clip relative to the body, the first end of the clip being of annular configuration such that the body of the coupler extends through the annular first end. The body of the coupler is removably engaged by a second end of the clip, the second end being of C-shaped configuration such that the C-shaped second end cooperates with the body of the coupler. Disconnection of the body from the port is permitted only when the C-shaped second end is removed from engagement with the body of the quick coupler so that the collar 13 can be moved axially, as indicated by arrow B, FIG. 9, relative to the body 12 for permitting disconnection of the body 12 from the port 14 thus preventing inadvertent disconnection of the body 12 from the port 14.

The quick coupler retention clip 10 according to the present invention provides a low cost retention clip which improves the efficiency of operating a multiple outlet supply of heated water or other solution. The quick coupler retention clip device not only prevents inadvertent disconnection of a quick coupler conveying heated material, but also ensures that the correct portions of the coupler are coupled to one another and that such portions are positively coupled. That is, the C-shaped end of the clip can only be fitted in the groove 15 if the collar 13 is all the way forward so that the body and the port are locked together. Therefore, the quick coupler is either obviously uncoupled, or completely coupled.

The present invention has been described in terms of the preferred embodiment, and it is recognized that equivalents, alternatives, and modifications, aside from those expressly stated, are possible and within the scope of the appending claims.

For example, it will be recognized that the present invention may be suitably employed in numerous industries including the plastics, automotive, appliance, housewares and electronics industries, and may be suitably employed in various methods of production including injection molding, blow molding, thermo-forming, rotational molding or other molding methods.

Additionally, the present invention may be utilized with any type of quick coupler, such as those in food and beverage, die casting and pneumatic applications, provided the quick coupler has a groove or other means to promote reception of the retention clip.

What is claimed is:

1. A quick coupler retention apparatus comprising:
   a quick connect coupler including a body and a collar couplable to a port at one end and a hose at another end, and a connector couplable to another end of the hose; and
   a clip device having:
      a unitary clip having a first and a second end;
      the first end of the clip including an annular end configured to receive a portion of the coupler extending therethrough to anchor the first end of the clip to the body of the coupler;
      the second end of the clip having a C-shaped configuration to removably engage a groove in the body of the coupler;
      a strap extending between the first and second ends of the clip to secure the first and second ends together, wherein disconnection of the body from the port is prevented when the C-shaped second end is engaged with the groove so that inadvertent disconnection of the coupler from the port is prevented;
      a cap of generally cylindrical configuration, the cap having a first and a second side, the first side of the cap defining an orifice for the removable reception therein of a portion of the coupler, the second side of the cap defining an opening to receive therein one end of the port, wherein the orifice permits the removable engagement of the body to the port such that the body and port are couplable together, and wherein the cap and the unitary clip are similarly color-coded with respect to one another so that coupling together of a correct body and a correct port is encouraged.

2. The quick coupler retention clip device of claim 1 further comprising a ring-shaped portion adapted to be secured to and extendable around a second connector coupled to a distal end of the hose having the retention clip device, wherein the ring-shaped portion, the unitary clip, and the cap are similarly color-coded so that each is readily identifiable.

3. A method for preventing an inadvertent disconnection of a body from a port of a quick coupler, the method comprising the steps of:

anchoring a first end of a unitary clip relative to the body, the first end of the clip being of annular configuration such that the body of the coupler extends through the annular first end;

removably engaging the body of the coupler with a second end of the clip, the second end being of C-shaped configuration such that the C-shaped second end cooperates with a groove defined by an axially movable collar and the body of the coupler; and permitting disconnection of the body from the port only when the C-shaped second end is removed from engagement with the groove of the coupler and when the collar has been moved axially relative to the body so that inadvertent disconnection of the body from the port of the quick coupler is prevented.

* * * * *